Sept. 30, 1952  J. R. ALBRIGHT  2,612,113
PUMPING UNIT
Filed June 14, 1946  10 Sheets-Sheet 1

Inventor
John R. Albright
By McCanna and Morsbach
Attys.

Sept. 30, 1952 J. R. ALBRIGHT 2,612,113
PUMPING UNIT
Filed June 14, 1946 10 Sheets-Sheet 2

Inventor
John R. Albright
By
McCanna and Morsbach
Attys.

Sept. 30, 1952  J. R. ALBRIGHT  2,612,113
PUMPING UNIT

Filed June 14, 1946  10 Sheets-Sheet 3

Inventor
John R. Albright
By
McCanna and Morsbach
Attys.

Sept. 30, 1952     J. R. ALBRIGHT     2,612,113
PUMPING UNIT

Filed June 14, 1946     10 Sheets-Sheet 5

Inventor
John R. Albright
By McCanna and Morsbach
Attys.

Sept. 30, 1952     J. R. ALBRIGHT     2,612,113
PUMPING UNIT

Filed June 14, 1946     10 Sheets-Sheet 6

Sept. 30, 1952  J. R. ALBRIGHT  2,612,113
PUMPING UNIT

Filed June 14, 1946  10 Sheets-Sheet 7

Inventor
John R. Albright
By
McCanna and Morsbach
Attys.

Sept. 30, 1952     J. R. ALBRIGHT     2,612,113
PUMPING UNIT

Filed June 14, 1946     10 Sheets-Sheet 9

Inventor
John R. Albright
By McCanna and Morsbach
Attys.

Sept. 30, 1952   J. R. ALBRIGHT   2,612,113
PUMPING UNIT
Filed June 14, 1946   10 Sheets-Sheet 10
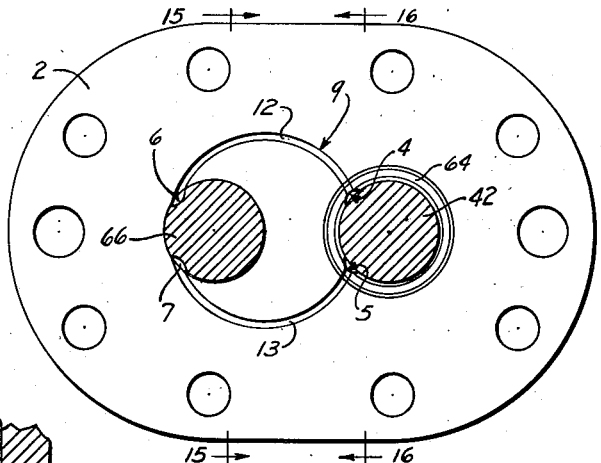
FIG.14
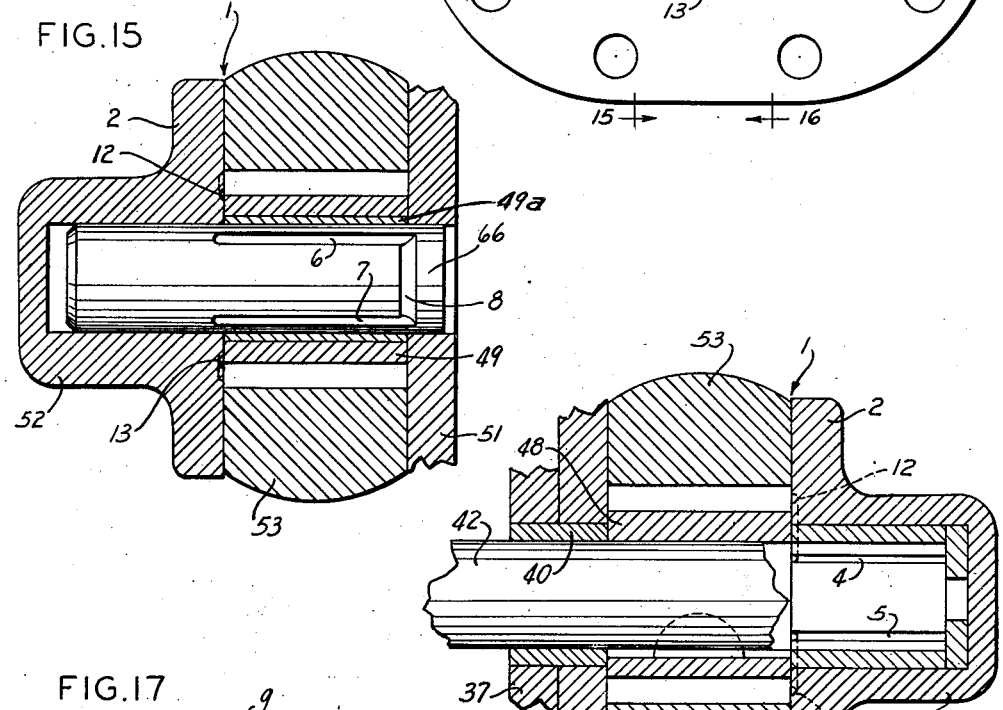
FIG.15
FIG.16
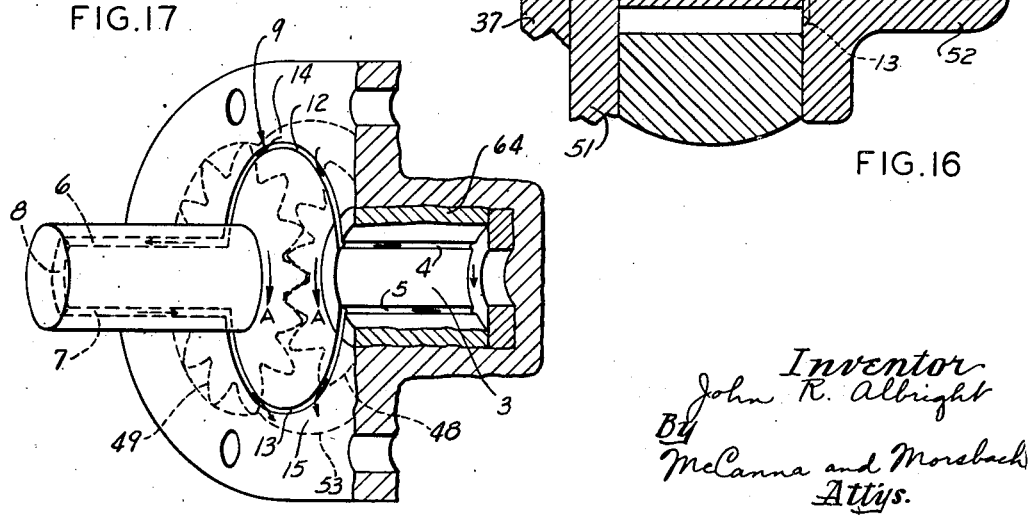
FIG.17
Inventor
John R. Albright
By
McCanna and Morsbach
Attys.

Patented Sept. 30, 1952

2,612,113

UNITED STATES PATENT OFFICE 2,612,113

PUMPING UNIT

John R. Albright, Rockford, Ill., assignor to Geo. D. Roper Corporation, Rockford, Ill., a corporation of Illinois Application June 14, 1946, Serial No. 676,818

17 Claims. (Cl. 103—42)

This invention relates to a pumping unit especially adapted for attachment to the power take-off of a conventional tractor where it may be used as a source of hydraulic power for operating agricultural equipment and the like, as, for instance, in raising and lowering the blades of a plow or cultivator, for adjusting the height of the cutting blades on a combine, and for operating hydraulic motors connected to the reel, and elevating, threshing, separating, and loading and unloading mechanism in such equipment.

The principal object of this invention is to provide an entirely self-contained pumping unit which is operable at speeds obtainable on conventional tractors and trucks and in which the pump, the hydraulic fluid reservoir, and the control valve are all assembled together in one compact unit so that all there is necessary to the installation thereof is to mount a single unit and connect the outlet conduit to the cylinder or hydraulic motor to be actuated. The pumping unit of this invention embodies many novel and advantageous features, among which may be mentioned the following:

(1) The pump may be readily mounted so as to move fluid in the desired direction, namely from the reservoir to the control valve, whether the drive shaft is rotating clockwise or counterclockwise.

(2) Production and repair is facilitated by the arrangement of parts so that practically all machining operations can be done on simple machines such as lathes and drill presses.

(3) Drive shaft bearing alignment problems are minimized by spacing the bearings a substantial distance apart, on opposite sides of the housing.

(4) A removable bearing cage or holder containing both the bearing and the oil seal is provided at the open end of the drive shaft so that both the seal and the bearing may be replaced in one simple operation by replacing the cage.

(5) An automatic unloading valve which by-passes fluid directly to the reservoir to maintain the service pressure at a predetermined maximum, combined with a reset pilot valve which is operable to render the unloading valve ineffective when desired so that the full working pressure of the pump may be made available at the service outlet when a momentary overload is wanted. This construction provides for a momentary, usable pressure increase of from 25% to 75% above the setting of the unloading valve for normal operation.

(6) Either the control valve or the pump may be removed without disturbing the other parts of the unit.

(7) The lowering valve is designed to give a micrometer rate of lowering, or a full rate of lowering as required, and which is so balanced that it may be operated at very light lever pressures.

(8) The control valve circuit is so arranged that the unloading, or automatic recycling of pump discharge fluid to the reservoir, is operated by the pressure on the work side of the circuit instead of on the pump side of the circuit as is conventional, and (9) Fluid conducting grooves in the pump drive shaft bearing and on the idler gear shaft providing communication between the high and low pressure sides of the pump for by-passing a portion of the pumped fluid through the grooves to lubricate the bearings.

The invention is described in detail hereinafter in connection with the accompanying drawings, in which—

Fig. 1a is a partial outside view of Figure 1 taken in the direction of the arrows 1a—1a;

Figure 1:
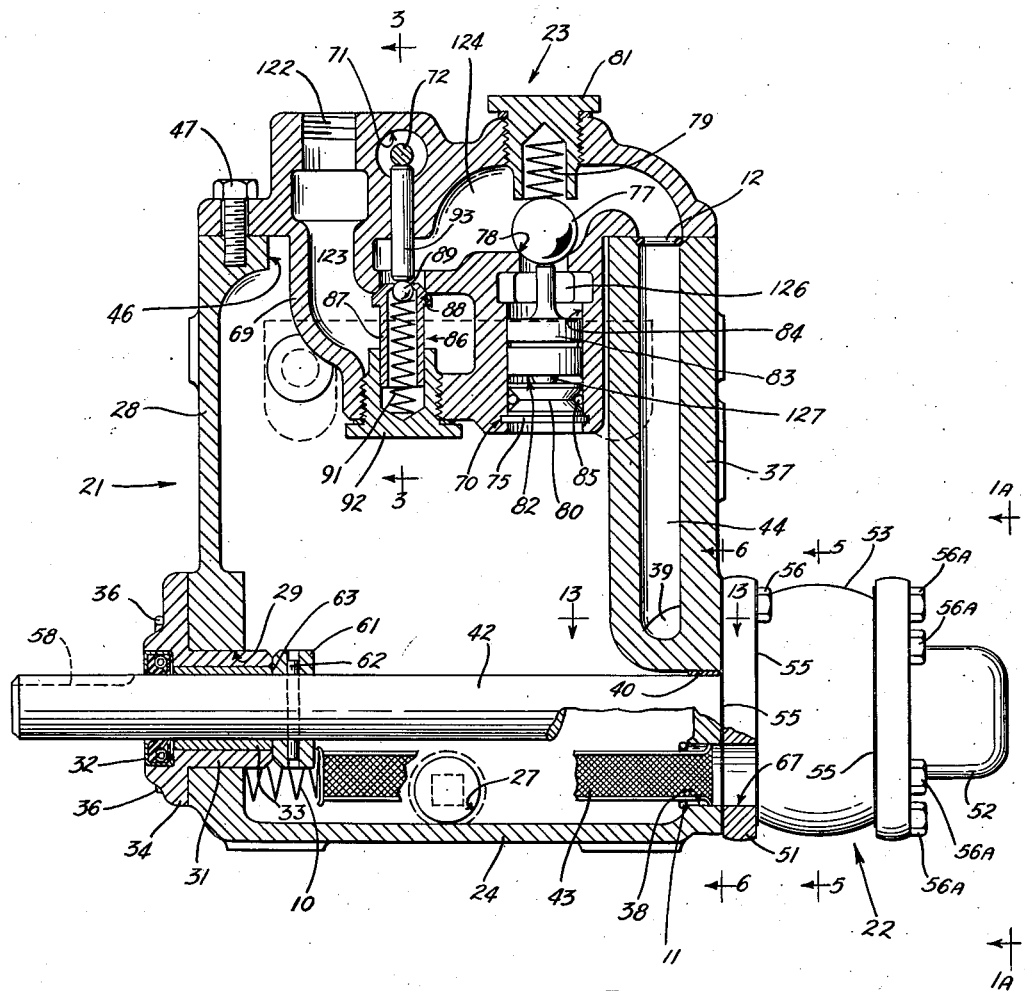
Figure 1 is a sectional side view of a preferred embodiment.
Figure 1A:
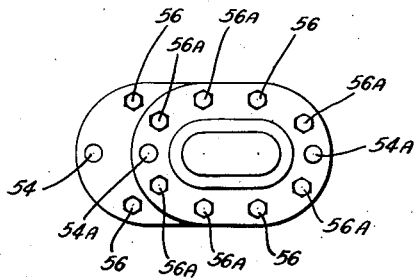
Figure 2:
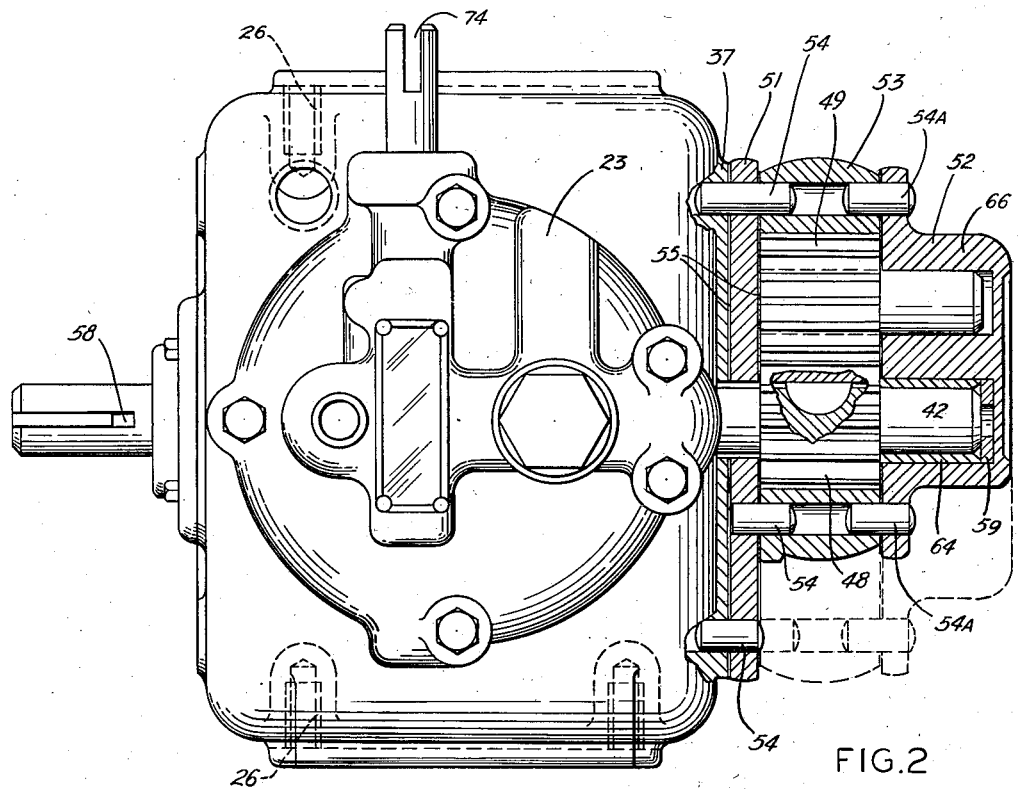
Fig. 2 is a partially sectioned top view of Figure 1.
Figure 3:
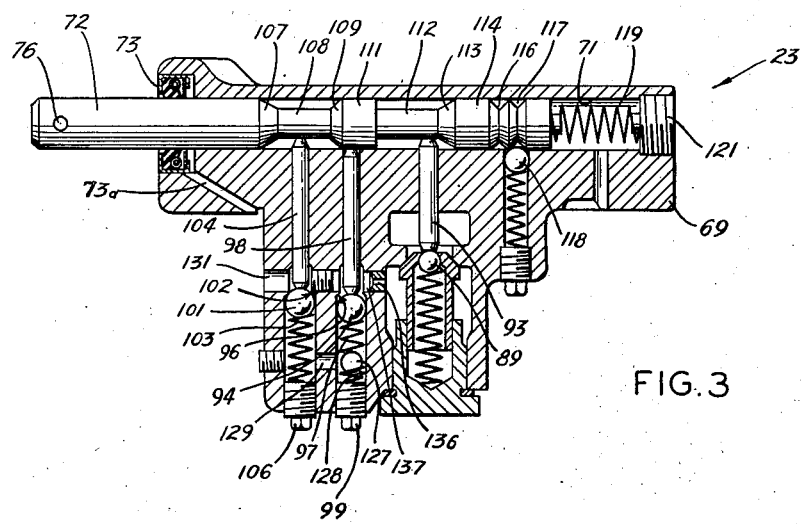
Fig. 3 is a sectional view of the control valve portion of Figure 1 taken on the line 3—3.
Figure 12:
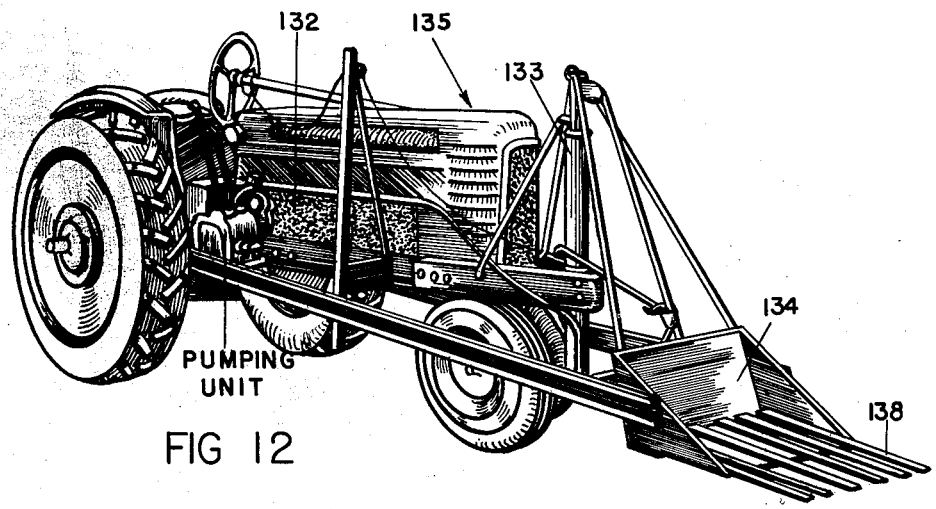
Figure 13:
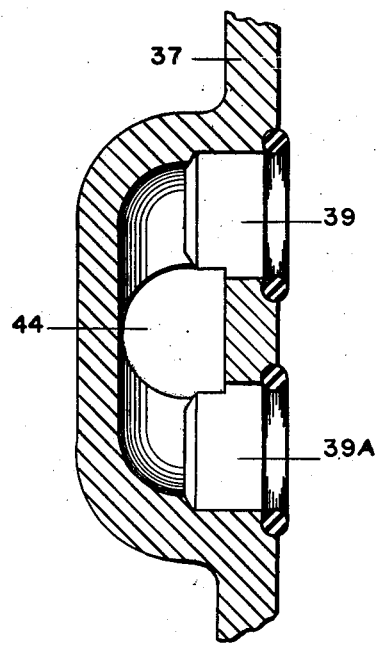

Figs. 7—11, inclusive, are diagrammatic views of the pumping unit shown in Figures 1, 2 and 3, and shows the arrangement of parts and direction of fluid flow in various operative positions;

Fig. 12 is a diagrammatic view showing one method of applying the present unit to a lifting frame mounted on the front end of a tractor;

Fig. 13 is a sectional view of Figure 1 taken along the line 13—13;

Fig. 14 is a sectional view of Fig. 2 taken on the line 14—14 showing the fluid conducting grooves for lubricating the pump bearings;

Fig. 15 is a sectional view of Fig. 14, taken on the line 15—15;

Fig. 16 is a sectional view of Fig. 14, taken on the line 16—16; and

Fig. 17 is a fragmentary perspective view of the pump showing the relation of the oil grooves.

Like parts are designated by like reference characters throughout all the views including the diagrammatic views.

Figure 6:
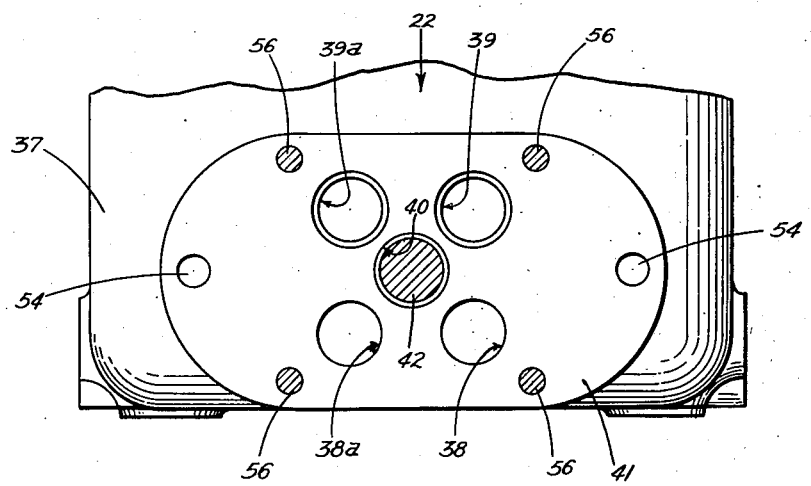
Fig. 6 is a sectional view of Figure 1 taken on the line 6—6.

Referring now more particularly to the drawings, the hydraulic unit comprises in combination three separable units or sub-assemblies—(1) the oil sump or reservoir 21, (2) the rotary gear pump 22, and (3) the control valve 23. The sump 21 comprises a housing 24 having drilled and tapped bolt holes 26 in two opposed sides for suitably mounting it. These sides are also provided with plugged holes 27 for draining and for connecting to an auxiliary tank when needed to provide additional reservoir capacity. The front wall 28 is formed with an opening 29 to contain an outboard bearing cage 31 which includes in its sub-assembly an oil seal 32 and a bushing 33. The cage 31 is provided with a drilled flange 34 mounted onto the wall 28 by bolts 36. As shown in Fig. 6, the back wall 37 of the housing is formed with an opening containing a shaft bearing 40 to receive the pump shaft 42 and is formed with openings 39 and 39a, one or the other of which provides communication between the pump discharge and the bifurcated discharge passage 44 which also connects with the control valve (see Fig. 1). The reservoir housing also has openings 38 and 38a one or the other of which provides communication between the reservoir and the pump inlet through the strainer 43. As shown in Fig. 1, the strainer 43 comprises a cylindrical screen with a closed end portion to which a spring 10 is mounted, as by welding or soldering. The opposite end is inserted within one or the other of the lower casing outlet openings, in this instance the opening 38. The spring 10 bears against the casing wall 28 to hold the strainer in place and the collar 11 limits the distance it can move into the opening 38. Any other suitable limiting means may be employed, for example forming the back-up plate opening 67 small enough to engage the end of the screen. The top of the reservoir housing has a large opening 46 in which the control valve sub-assembly 23 is mounted by means of bolts 47 and through which the strainer 43 may be readily removed for cleaning or shifting to other opening when reversing rotation of pump merely by first removing the five bolts 47. The pump 22 comprises a driven gear 48 and an idler gear 49 rotating against a back plate 51 on the sump side and a bearing housing 52 on the other side. The idler gear is provided with a wear resistant, replaceable bushing 49a, which may be made of bronze and shrunk-fit or pressed within the gear. A spacer member 53 is formed to closely fit the outer contour of the gears and is positioned with respect to the backing plate 51, and bearing housing 52, by means of dowel pins 54 and 54a. Bolts 56, which are tapped into the reservoir wall 37, and bolts 56a, which are tapped into the backing plate 51, are employed to assemble the pump onto the reservoir housing. Gaskets 55 prevent leakage between the parts. The drive shaft 42 is keyed to the driven gear 48 at one end and at the other end is suitably formed as with a key slot 58 for connection with a power applying means, for example, the conventional power take off on a tractor or truck. The shaft 42 is restrained against axial movement by means of the thrust bearing 59 in the bearing housing 52 and the thrust collar 61 attached by pin 62 and rotatable against the inner end surface 63 of the bearing cage 31. By spacing this cage as far as possible from the driven gear, alignment of its bearings 64, 40 and 33 in manufacture is greatly simplified.

O ring gaskets are placed in the counterbored recesses of openings 39 and 39a (Fig. 13) which are compressed against the metal face of back plate 51. These gaskets provide the sealing means for the high pressure oil. An O ring 12 is also used to seal the connection between the sump and control valve at the end of the passage 44.

Figure 5:
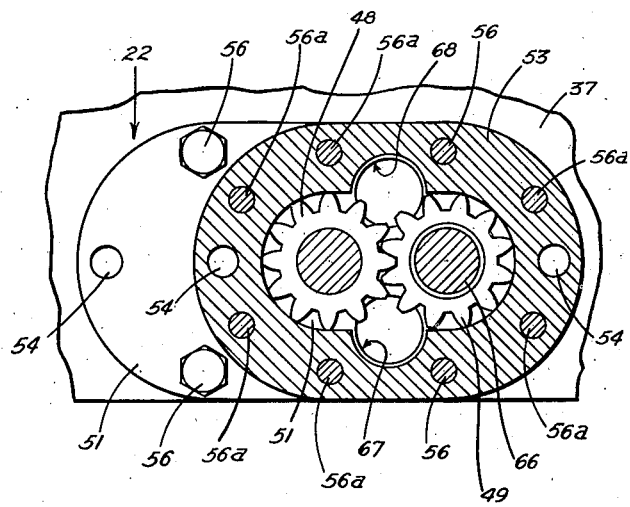
Fig. 5 is a sectional view of Figure 1 taken on the line 5—5.

Rotation of the gears will always be such that oil or other hydraulic fluid employed is drawn into the pump through the reservoir housing opening 38 or 38a, depending on the assembly of the pump, one or the other of the backing plate openings 67 or 68, and discharged out of the other of the backing plate openings, through the reservoir housing opening 39 or 39a and through the bifurcated passageway 44 into the control valve. In order to provide for this direction of flow regardless of the direction of rotation of the particular power take-off for, in practice, some will rotate clockwise and some will rotate counterclockwise, the pump 22 may be mounted either in the position shown in Figs. 5 and 6 (and also shown in solid lines in Fig. 2), or in an opposite position in which the pump is rotated 180° around the drive shaft 42 (as shown by broken lines in Fig. 2). That is, assuming the pump as mounted in the Figs. 5 and 6 position is proper for clockwise rotation of the shaft 42, the pump may be adapted to counterclockwise shaft motion by removing the mounting bolts 56, then rotating the entire pump including the bearing 40 a full 180° about the drive shaft 42, and then reassembling. In the first case, the housing opening 38 would register with the backing plate opening 67 to permit fluid to be drawn into the pump and the backing plate opening 68 would register with the housing opening 39 to permit fluid to be discharged into the reservoir passage 44, as shown in Figs. 5 and 6. In the second case, housing opening 38a will register with the backing plate opening 68 to permit fluid to be drawn into the pump and the backing plate opening 67 will register with the housing opening 39a to permit fluid to be discharged from the pump into the passageway 44. The strainer 43 is located in either opening 38 or 38a depending on which is the pump inlet.

Another important feature of this particular construction which results from the outside removable position of the bearing housing 52, spacer 53, and gears 48 and 49 is that the capacity of the unit may be changed with a minimum of time and expense by replacing the gears with ones of different width and, of course, changing the spacer shaft and bearing housing accordingly. With this arrangement, the volume pumped may be preselected for any particular operating speed by changing a minimum number of parts. That is, if the pump is to be changed to operate at a higher speed but the same volume of pumpage is desired, the case and gears will be made narrower and the driver and idler shafts shortened accordingly.

An important part of my invention, residing in the pump structure, is the means I have provided for pressure lubrication of the pump gear bearings by by-passing a quantity of the high pressure hydraulic medium, usually oil, through the bearings. Referring to Figures 14, 15, 16, and 17, the numeral 1 indicates the interface between the flanged or plate portion 2 of the bearing housing 52 and the gears 48 and 49. The bore 3, which journals the drive shaft within the bushing 64, is formed with a pair of longitudinal grooves 4 and 5, which serve alternately as inlet and outlet respectively for lubricant, depending on the direction of rotation of the gears. The idler shaft 66 is likewise formed with a pair of grooves 6 and 7, the ends of which intersect the interface 1 and the opposite ends of which are joined by a circumferentially extending groove 8. The grooves 6 and 7 likewise serve alternately as inlet and outlet respectively for lubricant depending on the direction of rotation of the gears. It is preferable that the length of the grooves 4 and 5 be coextensive with that part of the drive shaft 42 engaged within the bore 3 for lubricating effectiveness; and for the same reason it is preferable that the grooves 6 and 7 be coextensive with the width of the idler gear.

The lubricating grooves 4, 5, 6 and 7 are properly inter-connected in one simple operation by machining a circular groove 9 in the plate 2, adjacent the interface 1. The groove 9 is broken by the openings for the idler and drive shafts so that in effect, it becomes two circularly extending grooves 12 and 13 of the same radius.

The grooves 4 and 5 and the grooves 6 and 7 will preferably be positioned on the unloaded sides of the drive-shaft 42 and idler shaft 66, respectively, so that fluid pressure exerted against the gears will, in the case of the idler gear, force it away from the grooves 6 and 7, and in the case of the driveshaft, force it away from the grooves 4 and 5 to the extent allowed by the clearance of parts in each case. This feature provides for the desirable build-up of a wedge-shaped film of lubricating fluid on the bearing surfaces having maximum thickness at the grooves.

The outlines of the gears and spacer are superposed on Fig. 17 to show the relative position of the parts and to facilitate a ready understanding of the operation which, briefly, is as follows: Assume that the gears are rotating in the direction of the arrows A. 14 will be the high pressure, or discharge side of the pump and 15 will be the low pressure, or intake side. A quantity of the oil being pumped will enter the circularly extending groove 12 and flow both ways. Part of it will flow into the bore groove 4, across the end of the drive shaft 42, into the groove 5 and out the groove 13 into the chamber 15. As the drive shaft rotates it will be supplied by a continuous film of lubricant from grooves 4 and 5. The other part of the fluid entering groove 12 will flow through grooves 6, 7 and out 13 into the chamber 15. As the idler gear rotates on the shaft, it is continuously supplied with a film of lubricant from the grooves 7 and 8.

Figure 4:
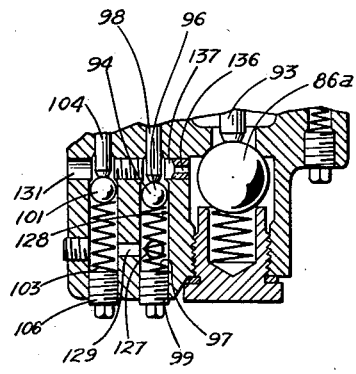
Fig. 4 is a section similar to Fig. 3 showing another modification.

The control valve 23 comprises a housing 69 having in this case a cylindrical bore 71 extending through it and a reciprocable cam shaft 72 slidable between operative positions. To prevent the passage of oil or dirt past the cam shaft a sealing member 73 will be provided. Drain holes 73a are provided to prevent the building up of excessive pressure behind the seal. The exterior end portion of the cam shaft will be slotted, as shown at 74, and drilled, as shown at 76, for attachment of a conventional operating lever or flexible cable (not shown). The housing 69 is provided with the following valves—a ball-shaped unloading valve 77 normally pressed against its seat 78 by the springs 79 which is held in place by the screwed cap 81 (which also serves as a stop for the valve 77), this unloading valve adapted to be unseated by pressure acting on the head end 82 of the piston 83 slidable within the bore 84; a main valve 86 comprising an elongated, conical-faced, primary member 87 engageable with the seat 88, and a secondary or pilot ball member 89 seated within the primary member and engaged by the spring 91 which serves to press both primary and secondary members to their seats, the main valve assembly 86 being held in place by the screwed cap 92 and adapted to be unseated by the push rod 93; a ball-shaped pilot valve 94 for the unloading valve 77 normally pressed against the seat 96 by the spring 97 adapted to be unseated by the push rod 98 and held in place by the rotatable plug 99 which may be used to adjust the load of the spring 97 on the ball 94; and the ball-spaced reset pilot valve 101 normally pressed against its seat 102 by the spring 103, adapted to be unseated by the push rod 104, and held in place by the plug 106. As shown in the modified form of control valve in Fig. 4 the main valve 86 may take the form of a single large ball rather than the composite structure shown in Fig. 3. However, for ease of operation the Fig. 3 modification will be preferred, inasmuch as considerably less force will be required to unseat the pilot ball 89 than the large ball 86a. The cam shaft 72 is formed with cam surfaces 107, 108, 109, 111, 112, 113 and 114 so dimensioned and so positioned along its length that it will have four operative positions as follows: "lower," "hold," "raise," and "reset.". In the "lower" position the cam will open the unloading valve pilot 94 and the main valve 86. In the "hold" position it will open only the unloading valve pilot 94. In the "raise" position the cam will not open any of the valves, and in the "reset" position the reset pilot valve 101 will be opened. Detent grooves 116 and 117 engage the spring pressed detent ball 118 in both the "raise" and "hold" positions to maintain it against vibration or casual movement. A spring member 119 will be positioned between the end of the cam and the cap 121 to urge the cam to the left (in Fig. 3) whereby the cam will tend to assume the "raise" position from the "reset" position. The bore 84 has at its end portion an internal groove 70 fitted with a snap ring 75 to serve as a stop for the plug member 80, the latter being gasketed by the rubber ring 85 and serving to seal off the head end 82 of the piston. This particular construction of plug 80 may be substituted by a conventional threaded plug but the form shown is preferred since it effects a considerable saving in space and requires only a minor machining operation within the cylinder bore.

Normally, in the "lower" position fluid will flow backward from service through the outlet port 122, the passage 123, the main valve 86, the passage 124, the unloading valve 77, which is held open by fluid pressure supplied to the piston 83 through the open pilot valve 94, through the return port 126 to the sump; and if the pump is running at this time fluid from the passage 44 will likewise be returned to the sump through the unloading valve 77 and port 126.

In the "hold" position, if the pump is not running there will be no flow in any of the passages; if it is running the pump discharge will be by-passed back to the sump through the unloading valve 77 which is held open by pressure supplied to the piston through the cam-opened pilot valve 94.

In the "raise" position fluid will flow from the pump through the passage 44 past the closed unloading valve 77 through the passage 124, through the main check valve 86 which will be held open by the pressure, the passage 123 and out the outlet port 122 to service.

In the "reset" position any trapped fluid between the piston 83 and the plug 80 will be released through passage 127, the unloading pilot valve bore 128, the passage 129, the reset pilot valve 101, and out the passage 131 to the sump. This will cause the unloading valve 77 to close, and allow the full available pump pressure to be built up in the service outlet 122 for those occasions when a short time overload condition is wanted. The overload pressure during "reset" will discharge a small quantity of fluid past the unloading pilot 94 but it will not be operative to jack up the piston 83 to open the unloading valve 77 because this fluid is continuously being bled off to the sump through the reset pilot valve 101 and the passage 131.

The orifice 136 placed in conduit 137 limits the flow of oil to the unloading valve circuit. When the volume of oil introduced through the orifice 136 is less than the volume capacity of valve 101 pressure will build up in the circuit. This pressure build-up is from 25 to 75% above the value of the spring pressure set by spring 97. This build-up in pressure is effective in the operation of the unit to provide emergency power to the hydraulic circuit for very heavy loads.

Operation

Referring now to the sequence of operative positions, as shown in the simplified diagrammatic views in Figs. 7 through 11, assume that the conduit 132 is connected to apply pressure to the end of a single acting cylinder 133 (Fig. 12) which is adapted to lift a fork or lifting frame 134 attached to the front end of a tractor or bulldozer, generally designated by the numeral 136. Assume further that the tined end portion 138 of the frame 134 initially has been driven into a mass of wet, frozen straw or like material which will require an initially high load to break it free, but subsequently will require a somewhat lower load to continue the lifting action. For a complete description of the operating cycle, assume further that the tractor power take-off connecting the pump is at first declutched and the pump gears are not rotated. The sequence of pump and valve operations for breaking loose a portion of the frozen straw, lifting it, and lowering it again will now be described.

Figure 7:
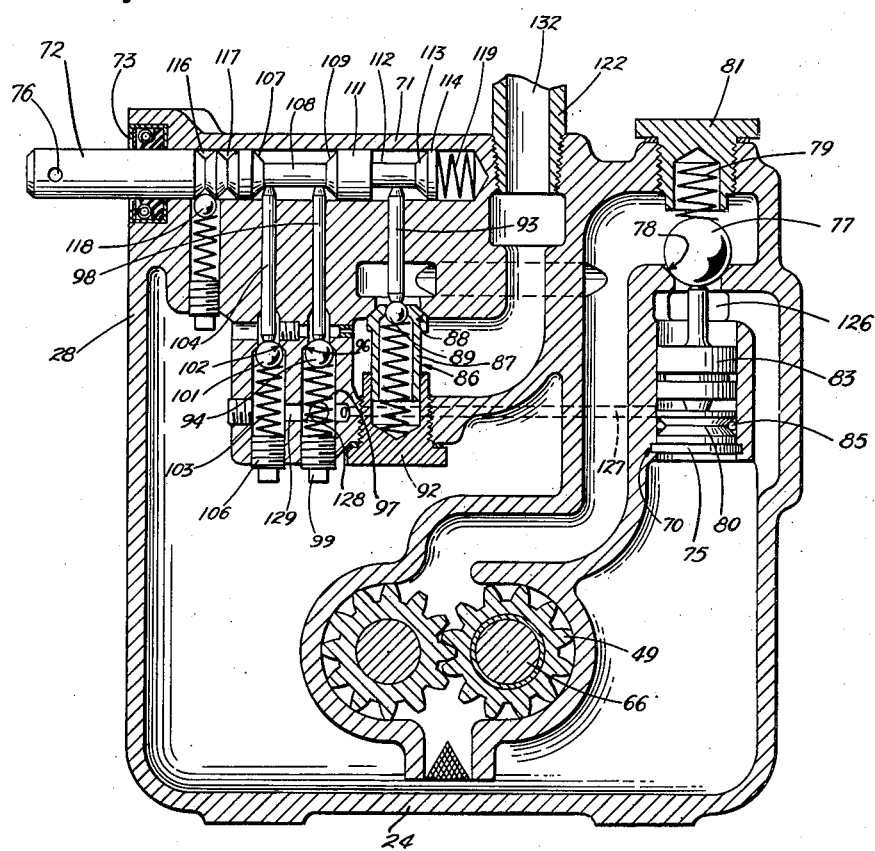

Fig. 7 shows the parts in their initial or inoperative positions with all valves spring-pressed against their respective seats. The spring 119 will have urged the cam shaft to the left to the "raise" position where it will be held against vibration by the detent ball 118 engaging the groove 116.

The first step will be to clutch the power take-off to start the pump gears rotating.

Figure 8:
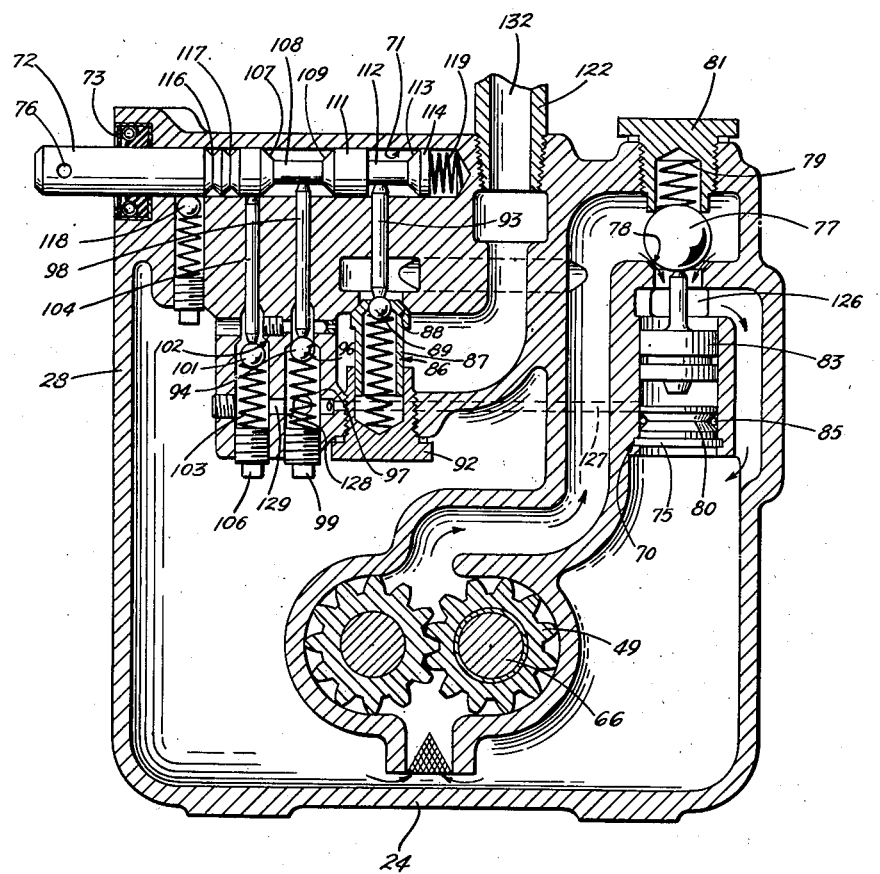

The next step will be to move the cam shaft 72 to its inward limit or "reset" position, as shown in Fig. 8. This will open the reset pilot valve 101, thereby accomplishing two things—first, it will release to the sump any fluid which may be trapped under the piston 83 and which otherwise would maintain the loading valve 77 jacked open; and second, to supply to the outlet conduit 132 the initial momentary overload pressure required to break loose the frozen straw. The maximum pump pressure is maintained in the conduit 132 until the straw is broken loose or until the cam shaft is released from the reset position to allow the reset pilot valve 101 to close. This is due to the fact that fluid above the overload pressures, which normally would be directed beneath the piston 83 to open the unloading valve 77, is instead by-passed directly through the reset pilot 101 to the sump.

Figure 9:
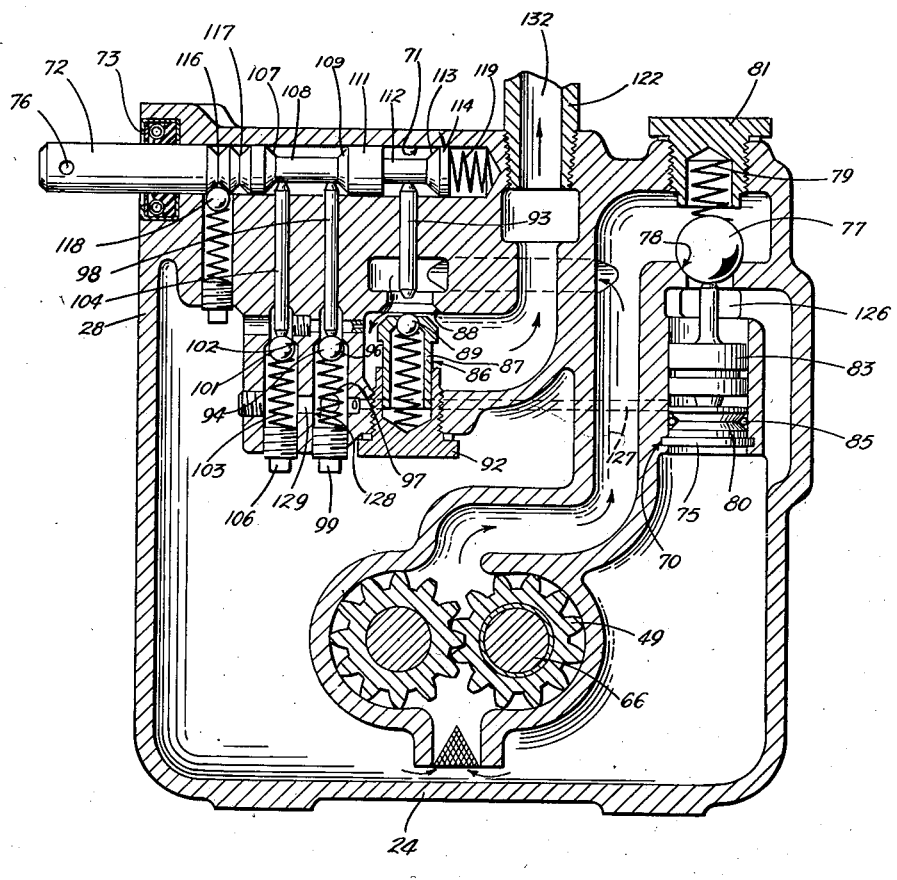

As soon as the overload pressure is effective to loosen the frozen mass the cam shaft will be released and under the urgence of the spring 119 will assume its "raise" position with fluid flowing past the main valve 86 into the conduit 132, as shown in Fig. 9, to lift the load of straw on the frame 134. During the lifting operation, the pressure will be at some lower value than that initially used to break the straw loose and with the reset pilot valve 101 closed this maximum will be determined by the strength of the spring 97, which loads the unloading pilot valve. For example, in one system employing a pump having a maximum outlet pressure capacity of 1200 lbs. per square inch, the unloading pilot valve spring 97 was selected to have a suitable strength to open at 600 lbs. so that when the 600 lbs. was exceeded fluid would flow past the valve 94, through the passage 127, into the space between the piston 83 and the plug 80 and open the unloading valve 77 whereby the outlet pump pressure would be relieved by recirculating the outlet fluid to the sump through the passageway 126. When the frame 134 reaches the upper limit of its travel, or if the frame 134 should be stopped by an obstruction that might cause a damage to the parts if the full pump pressure were applied, the resulting increase in pressure as the obstruction is reached will automatically open the unloading pilot 94 and then the unloading valve 77 to dissipate the pressure.

Figure 10:
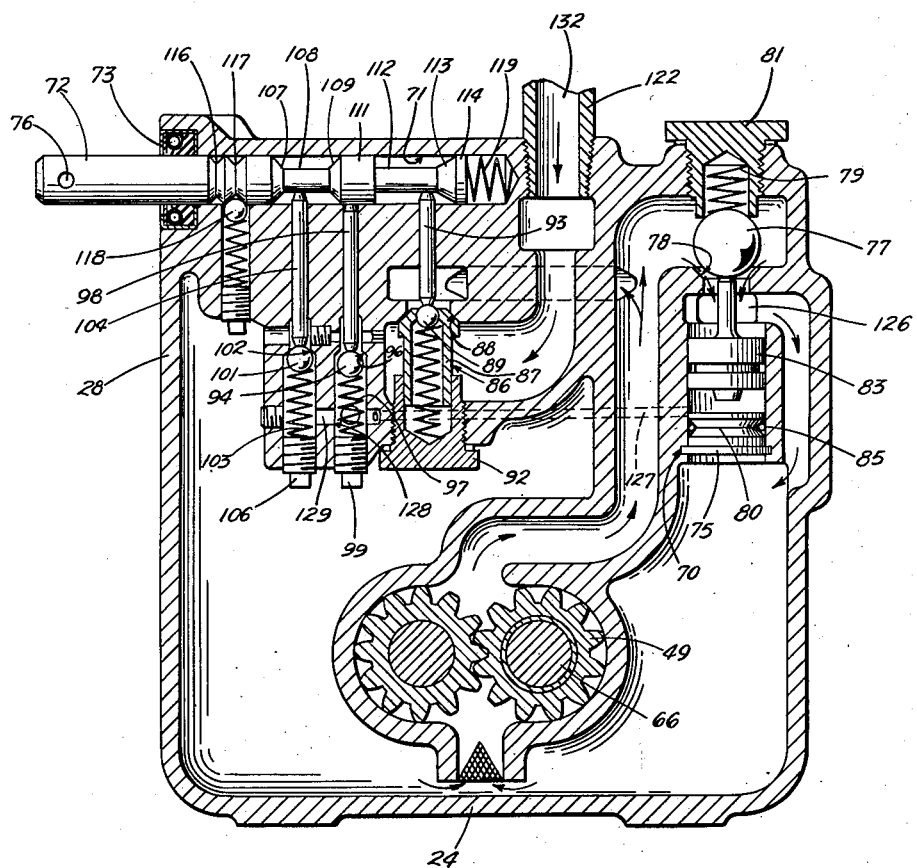

The load of straw can be maintained in its raised position by moving the cam shaft 72 to the "hold" position, as shown in Fig. 10. In this position the unloading pilot valve 94 is opened and it, in turn, directs fluid beneath the piston 83 to open the unloading valve 77. The pump unloading valve 77 will remain open with a lower pressure in the passage 44 than the pressure required to unseat the unloading pilot valve 94 by reason of the larger unbalanced area of piston 83 with respect to the unloading valve ball 77. With the pressure above the main valve 86 dissipated by the main stream being recycled to the sump in this manner, the spring 91 can press the valve to its seat, thereby shutting off back flow from the cylinder 133 and the load of straw can be held in any elevated position even when the pump is not producing pressure.

Figure 11:
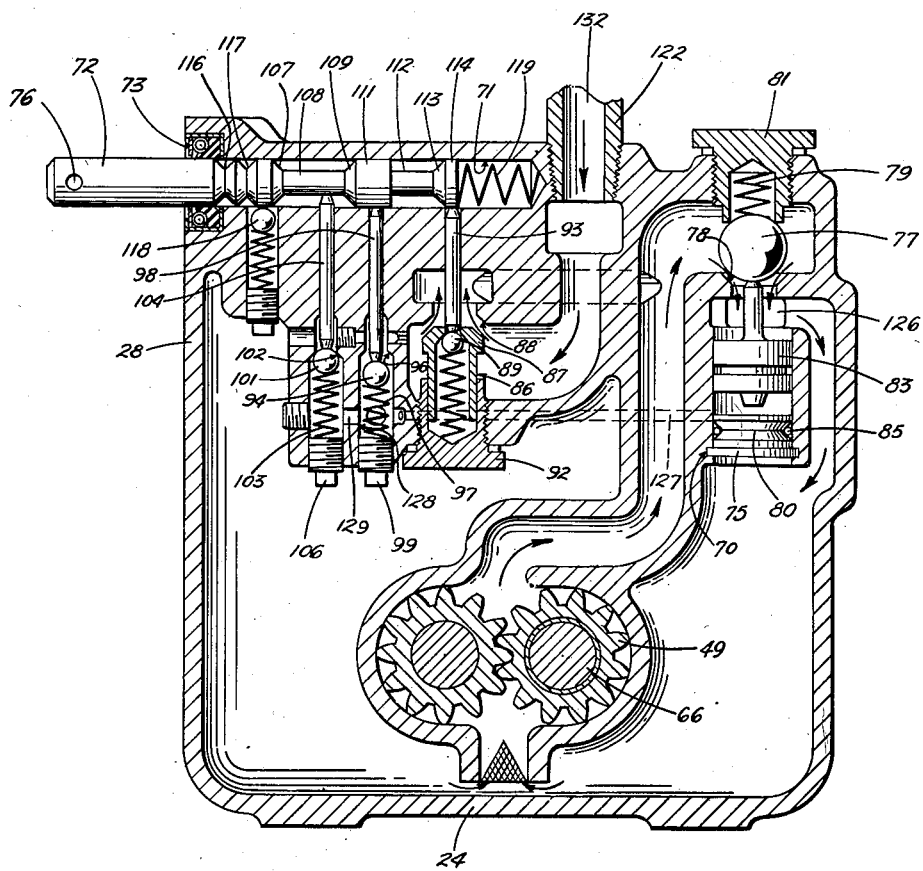

To lower the load the shaft will be moved into the range of "lower" position, as shown in Fig. 11 where the main valve 86 is unseated by the cam to permit back flow to the sump. The speed of lowering can be varied to suit the operator by moving the cam shaft back and forth slightly to select the degree of unseating required, that is, the push rod 93 can be depressed just sufficiently to unseat the pilot ball 89 or it may be depressed sufficiently to move the primary valve member 87 a substantial distance from its seat.

While I have shown a cam member 72 which is reciprocable within the bore 71 to operate the valves, it will be obvious that a number of different modified forms of cams may be employed, for instance, a rotatable cam or one that is both rotatable and reciprocable may be employed instead of the one shown. It will also be obvious that the various specific features of the present invention, which are shown only by way of illustration, are subject to considerable modification within the spirit of this invention and that the invention is limited only within the scope of the appended claims.

I claim:

1. A pumping unit comprising a pump, a reservoir, and a control valve; means for effecting communication from said reservoir to said control pump through said pump; said control valve having a spring-closed unloading valve in the means connecting said pump to said control valve, said unloading valve being operably associated with a pressure actuated device for opening it; said control valve having a normally closed main valve connecting the pump discharge to an outlet port; said control valve having a normally closed unloading pilot valve adapted to admit pressure to said pressure actuated device upon occurrence of a predetermined pressure in said outlet port; said control valve having a normally closed reset pilot valve adapted to relieve the pressure in said pressure actuated device when opened; movable means operably associated with said main valve and said pilot valves for operating them in a predetermined sequence.

2. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a spring-closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

3. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having an unloading pilot valve in a passage connecting said outlet port with the head end of said piston, resilient means for pressing said unloading pilot valve against its seat with a predetermined force whereby fluid pressure in said outlet port above a predetermined amount will unseat said unloading pilot valve and fluid under pressure will be admitted to the head end of said piston to open said unloading valve to relieve the pressure in said outlet port by recycling at least a portion of said pump discharge fluid directly back to the said reservoir; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

4. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having an unloading valve comprising a normally closed ball check valve in a passage between the pump discharge and the reservoir to prevent communication therebetween when closed, a piston reciprocable within, a ball aligned with said check valve and having an extension engageable with said ball to unseat it when pressure is applied to the head end of said piston; said control valve having a normally closed main valve in a passage connecting the pump discharge to an outlet port adapted to be connected to a service line; said control valve having a normally closed unloading pilot valve in a passage connecting the outlet side of said main valve of the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

5. A pumping unit according to claim 2 in which the area of the head end of said piston is greater than the seat area of said unloading valve and the opposite end of said piston is subjected to the same pressure as the fluid in said reservoir whereby the piston will be urged to open the unloading valve whenever the latter and the piston head end are subjected to any pressure above that in said reservoir.

6. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading pilot valve and said reset pilot valve whereby said cam has four operable positions, a first position where the main valve and the unloading pilot valve are held open, a second position where only said unloading pilot valve is held open, a third position where none of the valves are held open, and a fourth position where said reset pilot valve is held open.

7. A pumping unit in accordance with claim 6 wherein the cam means has resilient means associated therewith for urging it from said fourth to said first positions and detent means for holding said cam means in the second and third positions against the urgence of the resilient means.

8. A pumping unit in accordance with claim 2 wherein all of the valves are spring loaded ball check valves and said pilot valves and said main valve are adapted to be opened by push rods engaging said balls and associated with said cam means whereby movement of any one of said push rods against its corresponding ball overcomes the force exerted by the spring on said ball and causes the latter to be unseated.

9. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a main valve in a passage connecting the discharge side of the pump to an outlet or service port, said main valve having a primary valve member engageable in a fluid sealing manner with a seat formed in said control valve housing, said primary valve member having a secondary seat formed therein resiliently engaged by a secondary valve member; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence, said cam means being operably associated with said main valve in such a manner as to open said secondary member before said primary member.

10. A pumping unit comprising a reservoir housing having a pump housing and a control valve housing containing a control valve removably mounted thereon; said pump housing having a driven gear and an idler gear therewithin adapted to pump fluid from said reservoir housing to said control valve housing, said pump housing being mountable upon said reservoir housing in opposite positions disposed 180° apart about the axis of said driving gear whereby said pump may be assembled to move fluid from said reservoir to said control valve when said driven gear is rotated in either direction; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

11. A pump unit comprising a reservoir housing having a pump housing and a control valve housing containing a control valve removably mounted thereon; said pump housing having a driven gear and an idler gear therewithin adapted to move fluid from said reservoir to said control valve, said driven gear having a shaft extending through the opposite side of said reservoir housing, said gear housing including a pair of bearing members for said shaft positioned proximate to said driven gear on both sides thereof, said shaft also being rotatably journaled in a member attached to said reservoir opposite side, whereby a relatively wide spacing is effected between the support points of the shaft and alignment problems are minimized; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

12. A pump unit comprising a reservoir housing having a pump housing and a control valve housing containing a control valve removably mounted thereon; said pump housing containing engaging idler and driven gears adapted to move fluid from said reservoir to said control valve, said driven gear having an elongated driving shaft extending through said reservoir and out the opposite side thereof, a bearing cage removably mounted upon said opposite reservoir side having a bearing in which said shaft is rotatably journaled and having a fluid sealing member engaging said shaft whereby the replacement of both said bearing and said fluid sealing member may be effected by replacing said removable bearing cage; means for connecting the intake side of said pump to said reservoir; said control valve having a normally closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve; said control valve having a normally closed reset pilot valve communicating with the outlet side of said unloading pilot valve to relieve the pressure in said piston head end when opened; movable cam means operably associated with said main valve and said unloading and reset pilot valves for operating them in a predetermined sequence.

13. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a spring-closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a normally closed unloading pilot valve in a passage connecting the outlet side of said main valve with the head end of said piston for admitting fluid under pressure to open said unloading valve, said last-named passage having means therein to restrict the rate of flow of fluid passing to the head end of said piston; said control valve having a normally closed reset pilot valve communicating with the outlet side of said unloading pilot valve to relieve the pressure in said piston head end when opened; movable cam means operably associated with said main valve and said unloading and reset pilot valve for operating them in a predetermined sequence.

14. A pumping unit comprising a reservoir housing, a pump housing containing a pump having an intake and a discharge, and a control valve housing containing a control valve and removably mounted on said reservoir housing; means for connecting the intake side of said pump to said reservoir; said control valve having a spring-closed unloading valve in a passage connecting the pump discharge to the reservoir, said unloading valve adapted to be unseated by a pressure actuated piston associated therewith; said control valve having a normally closed main valve in a passage connecting the pump discharge to an outlet port adapted to be connected to a service line; said control valve having a spring-closed unloading pilot valve in a passage connecting the outlet side of said main valve with the head end of said piston for admitting fluid under pressure to open said unloading valve, said last-named passage having means to mechanically change the force exerted by said unloading pilot valve spring on said unloading pilot valve to change the pressure that is effective to open said unloading valve; said control valve having a normally closed reset pilot valve communicating with the outlet side of said unloading pilot valve to relieve the pressure in said piston head end when opened; movable cam means operably associated with said main valve and said unloading and reset pilot valve for operating them in a predetermined sequence.

15. A pump unit as described in claim 2 which has provided in said passage in which said unloading pilot valve is located means to control the volume of fluid introduced through said unloading pilot valve whereby pressures in the service line can be elevated 25 to 75% above the setting of said unloading pilot valve.

16. In a pumping unit comprising a pump, a reservoir, and a control valve, the combination of said reservoir having at least two opposed walls, said pump mounted on one of said walls, said one wall having an aperture formed therein providing communication between said reservoir and said pump inlet, a strainer within said reservoir having a portion telescopically engaged within said aperture, and spring means mounted on a portion of said strainer opposed to said aperture and compressed upon said opposite wall whereby said strainer may be removed for cleaning or replacement merely by drawing it out of said aperture against the compression of said spring.

17. In a pumping unit comprising a pump, a reservoir, and a control valve, said control valve being removably mounted upon an opening in said reservoir, said pump being mounted on said reservoir, an aperture formed in a wall of said reservoir communicating with the pump inlet, a strainer telescopically engaged within said aperture, a resilient member within said reservoir for normally maintaining a portion of said strainer positioned within said aperture, whereby said strainer may be removed for cleaning or replacement by first removing said control valve and then drawing the strainer out of the aperture against the force exerted by the resilient member followed by withdrawing it from the reservoir through said opening for the control valve.

JOHN R. ALBRIGHT.

REFERENCES CITED

The following references are of record in the file of this patent:

UNITED STATES PATENTS

| Number | Name | Date |
|---|---|---|
| 441,530 | Winfield | Nov. 25, 1890 |
| 1,293,611 | McCarthy | Feb. 4, 1919 |
| 1,734,779 | Randolph | Nov. 5, 1929 |
| 1,861,708 | Miki | June 7, 1932 |
| 1,893,125 | Biszantz | Jan. 3, 1933 |
| 1,912,737 | Svenson | June 6, 1933 |
| 1,976,227 | Howard | Oct. 9, 1934 |
| 2,018,119 | Brouse | Oct. 22, 1935 |
| 2,036,028 | Evans | Mar. 31, 1936 |
| 2,196,500 | Johnson | Apr. 9, 1940 |
| 2,202,912 | Johnson | June 4, 1940 |
| 2,291,279 | Jaworowski | July 28, 1942 |